Aug. 27, 1935.   F. O. JOHNSON   2,012,682
COMBINATION ROLL MAKING MACHINE
Filed Nov. 17, 1932   5 Sheets—Sheet 3
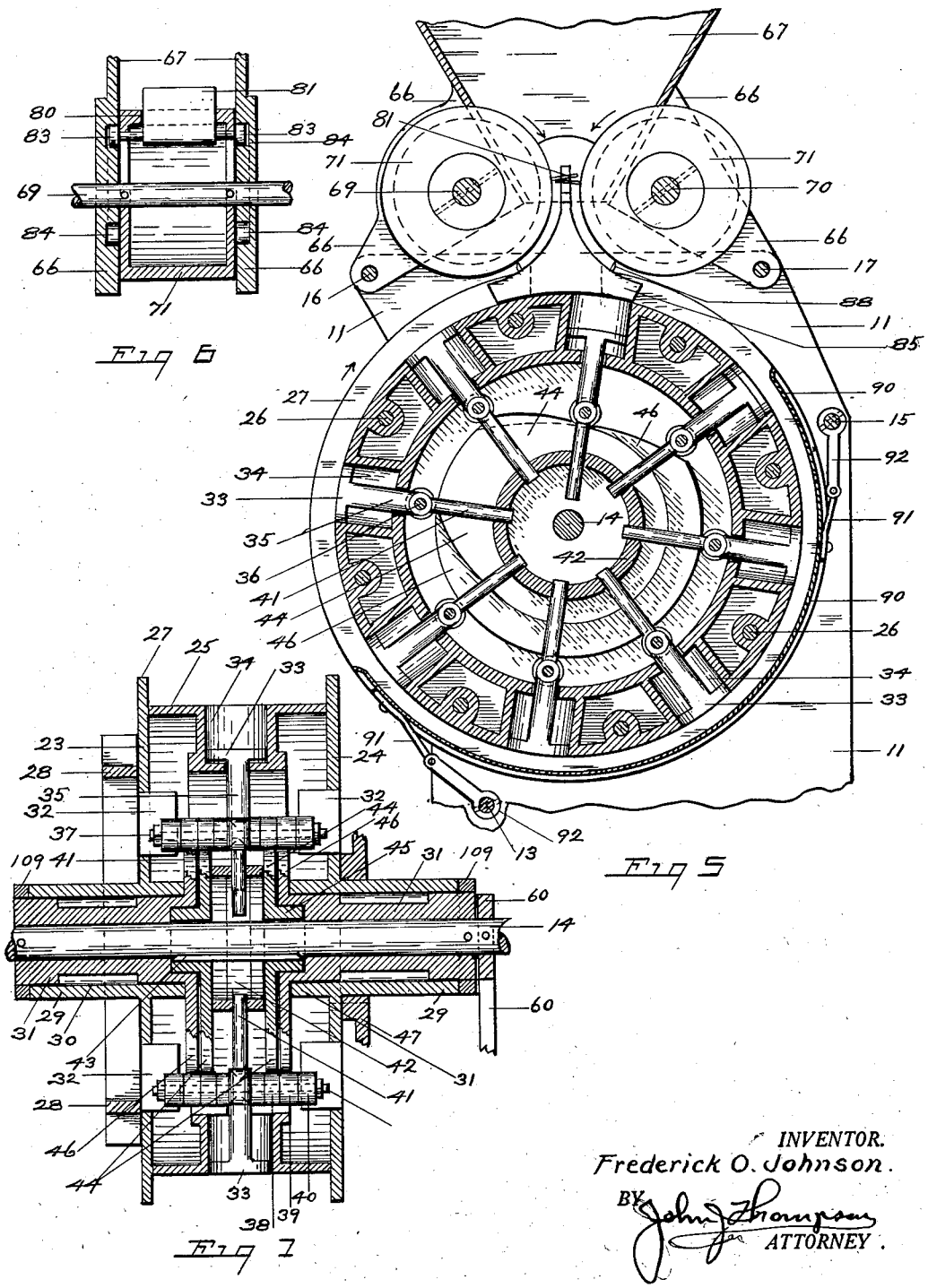
INVENTOR.
Frederick O. Johnson.
BY John J. Thompson
ATTORNEY.

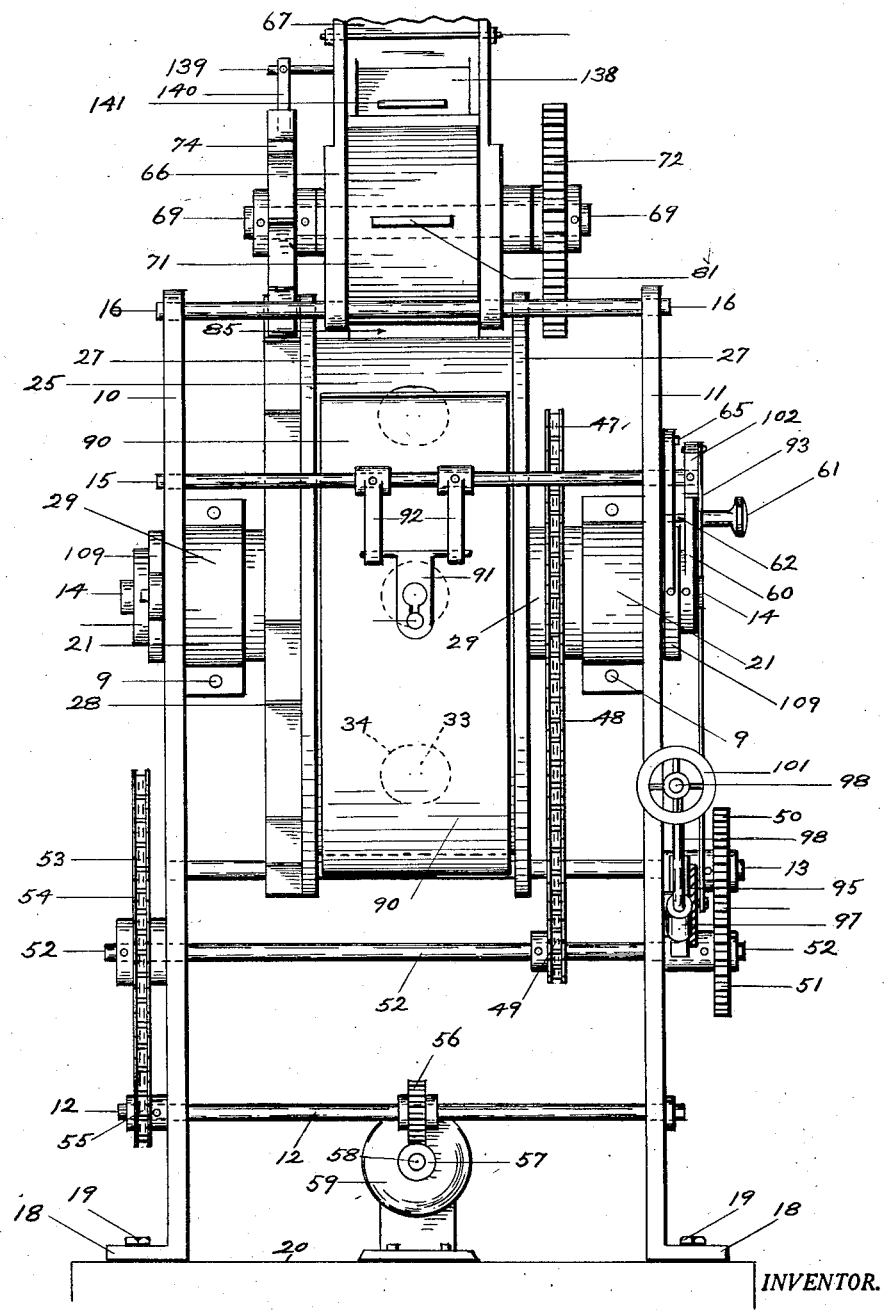

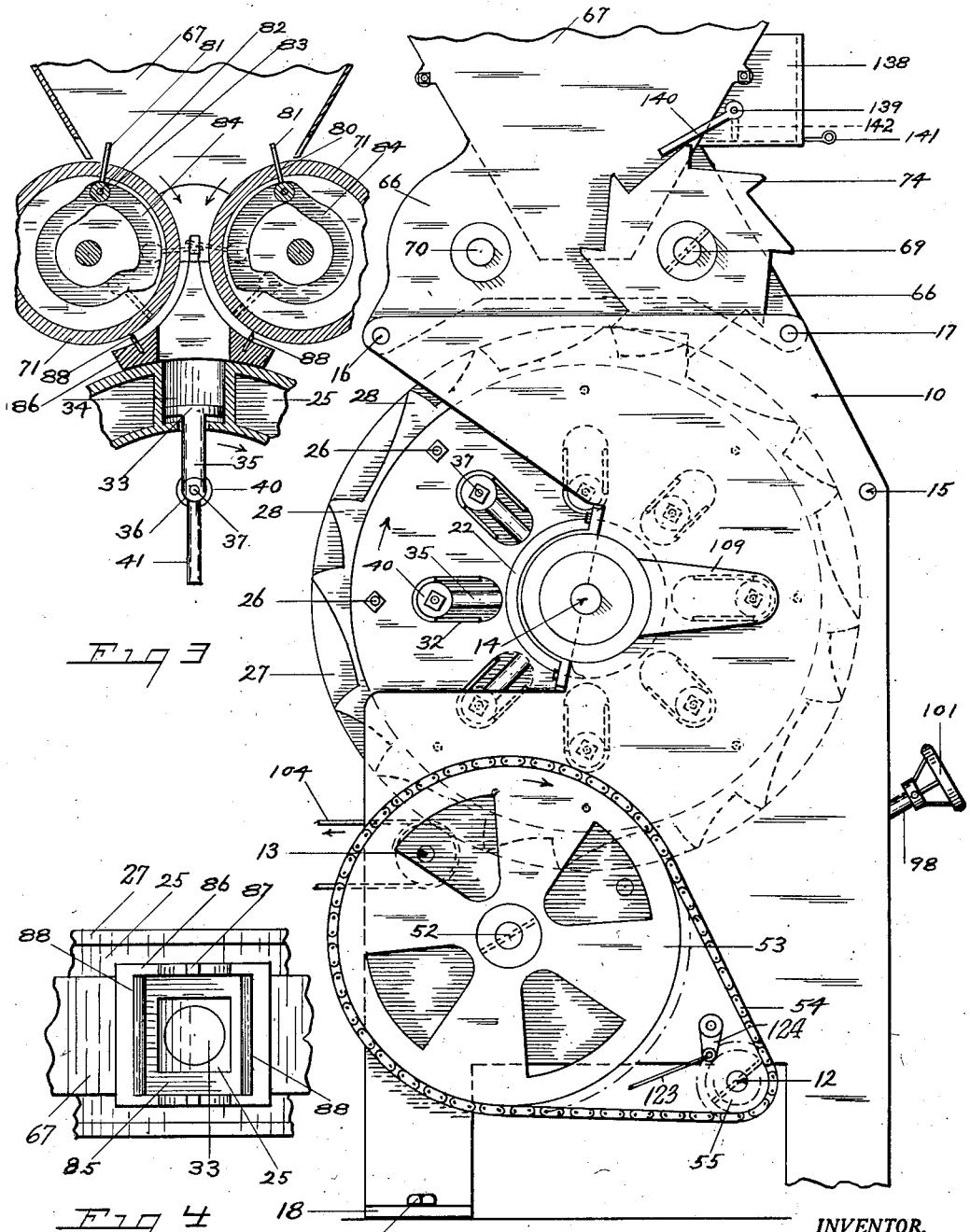

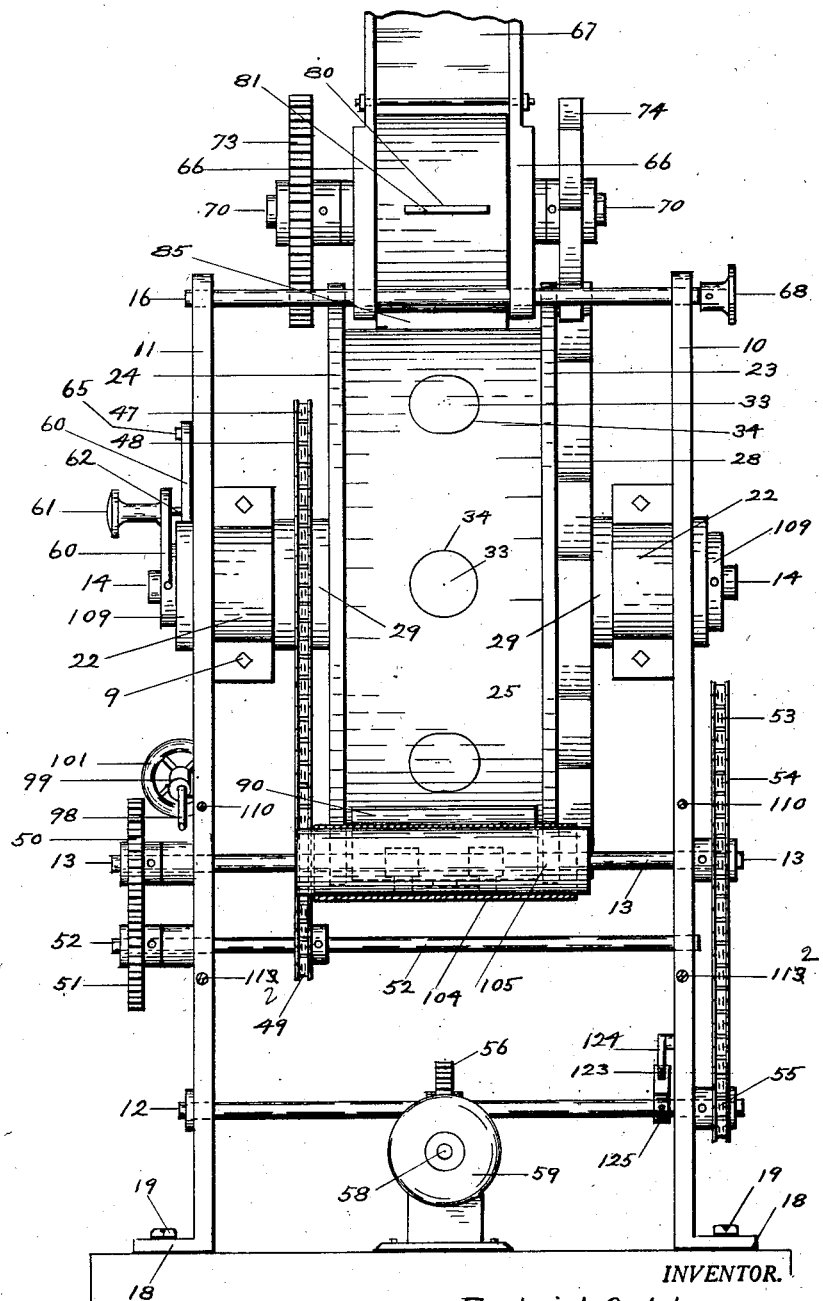

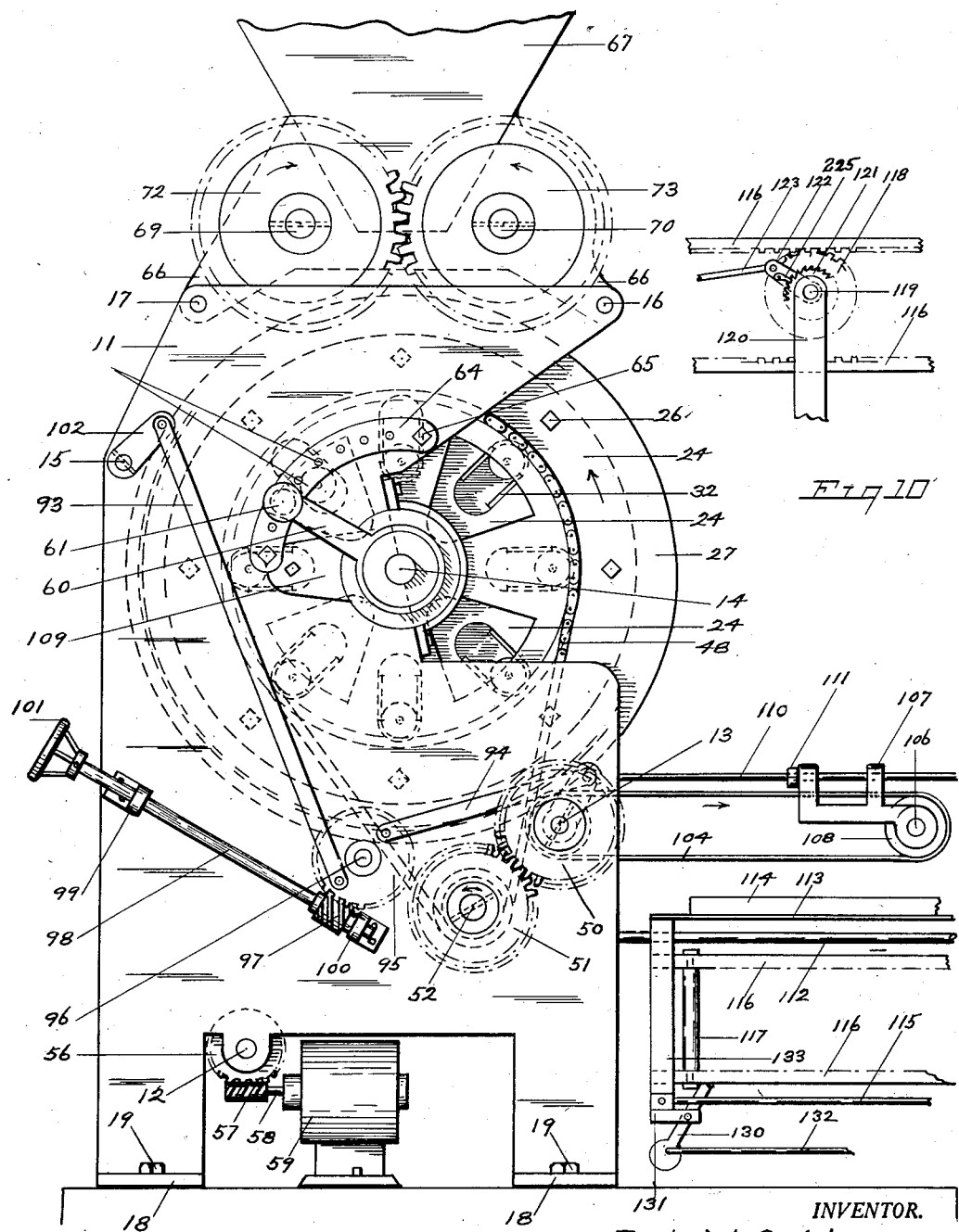

Patented Aug. 27, 1935

2,012,682

UNITED STATES PATENT OFFICE 2,012,682

COMBINATION ROLL MAKING MACHINE

Frederick O. Johnson, Beacon, N. Y.

Application November 17, 1932, Serial No. 642,996

2 Claims. (Cl. 107—15)

This invention relates to a combination roll making machine of that class used by bakers, and more particularly to a machine for feeding dough, dividing and compressing the same, then molding the divided pieces into the desired size and depositing the same upon the baking pans.

Another object of the invention is to provide means in connection with a rotating drum formed with radial pockets, of means for adjusting the size of said pockets, compressing the pieces of dough therein and ejecting the same upon a movable conveyor.

Another object being to provide means whereby the dough is drawn down from a supply hopper, compressed and severed into pieces from the main mass of dough.

Another object being to provide means for molding the severed pieces of dough into the desired shape for the roll, and adjusting said molding device.

Another object being to provide means for placing the molded pieces of dough in rows upon a baking pan ready for the oven.

Another object being to provide means for dusting the dough as it is being molded with flour.

Another object being to provide means for keeping the rotating feed rollers and the drum free from particles of dough.

While machines have been devised to accomplish some of these objects, they have been large, expensive and complicated, containing many parts and not capable of the desired speed, while this machine is designed to deliver about eighty rolls per minute of the French or Dog type.

The machine is simple of construction, contains few parts, but is fully adjustable as to weight of piece and size of molded formation.

Provision is also made for readily cleaning all parts of the machine that come into contact with the dough, as well as the quick renewal of any parts subject to wear, such as the compression, etc.

In the drawings—

Figure 1 shows a rear view of the machine.

Figure 2 shows the side elevation of the machine.

Figure 3 shows a partial sectional view of the feed hopper, feeding rollers, pressing and dough dividing and measuring means.

Figure 4 shows a partial top plan view of the dough dividing means and its relation with the drum.

Figure 5 is a partial sectional vertical view of the drum with its plungers and operating means.

Figure 6 is a sectional view of the feed rollers and pressing blade.

Figure 7 is a vertical sectional view of the drum with its plungers and their operating mechanism, taken at right angles to the view shown in Figure 5.

Figure 8 is a front elevation of the machine, with the panning mechanism removed.

Figure 9 shows a side elevation of the machine, illustrating the conveyor and a partial view of the panning mechanism.

Figure 10 shows a partial side view of the panning mechanism.

Referring to the drawings—

While the machine may be made in several shapes and sizes, it is here shown as comprising the two side frames 10 and 11, which are secured together by the drive shaft 12, the jack shaft 13, the drum shaft 14, and the rods 15, 16 and 17; said sides 10 and 11 being formed with the feet 18 for attachment by the bolts 19 to a suitable platform 20.

Said side frames 10 and 11, are also formed with the bearings 21, having the caps 22, and within which are rotatably mounted the drum shaft 14, upon which is secured the drum.

The combined molding and measuring drum is composed of the two sides 23 and 24, (see Figures 6 and 8), which are secured together and upon the opposite sides of the drum 25 by the stay bolts 26, said sides 23 and 24 projecting beyond the drum 25 and thus forming the flanges 27, while the side 23 is provided with a flange formed with teeth 28 which are spaced as shown in Figure 3, in pairs, the object of which will be explained in detail later on, and each side 23 and 24 is provided with a hub 29 having a large bore 30.

The drum 25 is formed with a series of radial pockets, circular in cross section, and herewith shown as being eight in number, but which may be of any desired number, and this drum 25 is formed with the axial alined hubs 31 which are mounted within the bores 30 of the sides 23 and 24.

Said sides 23 and 24 are also formed with a series of spaced openings having rounded ends and the flanged sides 32 which form guides for the roller bearings of the cross-heads of the plungers 33; said plungers 33 being slidably mounted within the pockets 34 of the drum 25, and which are formed with the shanks 35 having the cross-heads 36, within which is secured a long bolt 37 upon which is mounted on either side of the cross-head, three roller bearings, 38, 39 and 40, while said cross-head is also provided with a guide rod 41 in axial relation with the shank 35.

Referring to Figures 6 and 7, it will be seen that a guide ring 42 is provided and mounted in concentric relation with the shaft 14, and adjacent each side thereof is secured upon the shaft 14 by the key 43 the two similar cams 44 which have the hubs 45; while upon the outer side thereof is mounted the two cams 46 which are formed with the hubs 31 mounted within the bore 30 of the hubs 29, and secured by the arms 109 to the sides 10 and 11 so that the cams 46 can not rotate.

The sprocket wheel 47 is driven by the chain 48 from the sprocket 49 secured on the jack shaft 52, which is in turn rotated through the gears 50 and 51, which are mounted on the shafts 13 and 52; the shaft 52 being rotated by a sprocket wheel 53 secured thereon and driven by a chain 54 from a sprocket 55 on the shaft 12; which shaft 12 is rotated by a worm wheel 56 secured thereon and in mesh with a worm 57 on the motor shaft 58 of the motor 59.

Going back now to Figures 5 and 7, the guide ring 42 is formed with a series of radial bearings within which the guide rods 41 are mounted and within which they have a sliding movement, as the plungers 33 are moved within the pockets 34, this action being accomplished by the rollers 38 riding in contact with the face of the cams 44, the rollers 39 riding upon the face of the cams 46, and the rollers 40 riding in contact with the guides 32, as the drum is rotated, the cams 44 being rigid with the shaft 14, while the cams 46 are rigid with the lock arms 109.

For adjusting the travel of the plungers 33 within the pockets 34, and changing the weight or size of the pieces of dough that may be packed into said pockets 34, the relative position between the cams 44 and the cams 46 may be changed by the movement of the stationary shaft 14, which is effected by a handle 60 secured on one end thereof and which is provided with a snap handle 61 having a pin 62 adapted to engage any of a series of holes 63 in a sector 64 which is secured to the side of the machine by the bolt 65; and in this manner the high and low stops of the cams may be varied to effect the movement of the rollers thereon.

And it will be further noted that the shaft 14 with the cams 44 does not rotate, but that the drum and drum sides, ring 42 and plungers 33, all rotate with the drum hubs 29 upon the shaft 14 by the action of the sprocket 47 secured to one of the hubs 29.

Above the drum and between the sides 23 and 24 is mounted on the rods 16 and 17 the legs 66 of the feed hopper 67, in such a manner that by the removal of the rod 17 by the handle 68, the feed hopper 67 may be tilted up and back so that the drum and divider may be reached for cleaning.

Within the legs 66 of the feed hopper 67 are rotatably mounted the shafts 69 and 70, and mounted thereon between the legs 66 are the feed rollers 71; which are rotated in the direction shown by the arrows in Figures 1 and 6, by a pair of intermeshing gears 72 and 73 secured on the shafts 69 and 70 at one side of the hopper 67, while upon the end of the shaft 69 is secured a ratchet toothed wheel 74, the teeth of which contact with the teeth 28 on the drum side 23 in such a manner that as the drum is rotated the ratchet wheel 74 will be rotated in an intermittent manner, it being driven two teeth and then having a slight pause until engaged by the next pair of teeth 28 on the drum side.

Now referring to Figures 4, 5 and 7, the feed rollers 71 are formed with a radial slot 80 in the face thereof, and within this slot 80 is mounted a presser blade 81, which is formed on a shaft 82, having roller bearings 83 on the ends thereof and which are adapted to roll and travel within the cam races 84 which are formed in the sides or hopper legs 66, and it will be seen that as the feed rollers 71 are rotated the blades 81 will be extended through the slots 80, rotated for a moment with the roller 71 in an extended position within the lower part of the hopper, carried downward in an overlapped position as shown by the dotted lines in Figure 3, and then receded to a position flush with the face of the roller 71, and in this manner a portion of dough is engaged by the blades 81, carried downward between the rollers 71, and pressed by said blades 81 through an opening in the dough divider 85 and into one of the pockets 34 which is timed to register therewith at the moment that the feed rollers 71 are given their intermittent movement, the plunger 33 being in a receded position to receive the divided dough.

The dough divider 85 is formed with the two sides 86 having the tongues 87 mounted in the hopper sides with a slight vertical movement, and the lower part of the divider 85 rests upon the face of the drum 25, and as the drum starts to rotate that portion of the dough that has been pressed into the pocket 34 will be cut off or divided from that still in the hopper 67 by the shearing action between the drum 25 and the divider 85, the excess dough remaining in the lower part of the hopper and within the divider, as retained by the scraper blades 88 which are mounted in the divider 85 in scraping contact with the faces of the feed rollers 71, the above action being repeated as each pocket 34 comes in alinement with the opening in the divider, the feed rollers 71 remaining at rest during the dividing of the dough and the movement of the drum to bring the next pocket into loading position, this being effected by the position of the teeth on the drum side.

Referring now to Figure 5, as the drum 25 is rotated in the direction of the arrow, the receded plunger 33 with the dough on top of it starts to travel outward in the pocket 34 owing to the cam action, and the dough is ejected from the pocket 34.

Adjacent this point of ejection is the upper end of the adjustable molder band 90 which extends about one half way around the drum 25, is spaced therefrom and mounted on the supports 91 which are pivoted to the arms 92 mounted on the shafts 15 and 13, and which are connected by the rods 93 and 94 to the worm wheel 95 which is mounted on the side frame 11 on the stud 96; said worm wheel 95 being movable by a worm 97 mounted on a shaft 98 in the bearings 99 and 100 and operated by the hand wheel 101 to move the worm wheel 95 and with it the rods 93 and 94 and the cranks 102 and 103 to adjust the spacing of the molder band 90 with respect to the face of the drum 25, and as the dough is carried between said drum 25 and the molder band 90 it is molded or rolled and is delivered from the lower end of said band 90 upon an endless conveyor belt 104 which mounted upon a roller 105 on the shaft 13 and a shaft 106 mounted in the supports 107 and having a similar roller 108, and from this conveyor the dough is deposited upon the baking pans.

The support 107 is mounted on the rods 110 which are secured to and project from the frames 10 and 11, and these rods 110 are threaded and provided with the nuts 111 for the purpose of adjusting the supports 107 to tighten the belt 104.

For placing the divided pieces of dough upon the baking pans in rows, there is provided, under the conveyor belt 104, and mounted on the rods 112 which are attached to and project from the frames 10 and 11, a rectangular frame comprising the upright ends 133 which are secured together by the upper table 113 upon which the baking pans 114 are placed, and the lower stay rods 115, and in the ends 133 are slidably mounted the ends of a pair of toothed racks 116 which are secured together in spaced relation by the studs 117 in such a manner that these racks may have a vertical movement so that each rack in turn may be brought into mesh with a pinion gear 118 which is mounted on a transverse shaft 119 in the upright 120 which is secured to the base 20, the shaft 119 being rotated by a ratchet 121 secured on the shaft 119 and operated by a pawl 125 pivoted on an arm 122 mounted on said shaft 119, and which is operated by a reciprocating rod 123 which is secured to an arm 124 pivoted to the side frame 10.

Said reciprocating rod 123 is given movement by the arm 124 being moved by a crank 125 secured on the shaft 12, so that upon each rotation of the shaft 12 the rod 123 will impart a slight rotary movement to the shaft 119 and move the racks 116 and the table 113 with the pans 114, so that the divided pieces of dough from the conveyor 104 are deposited upon the pans 114 in the proper order.

For changing the direction of travel of the table 113, there are provided a pair of balanced arms 130, which are pivoted in the lower ends of the uprights 112 and which have arms 131 connected together by the hand rod 132, so that by a movement of said rod 132 the racks 116 may be raised to bring the upper rack out of engagement with the pinion 118 and the lower rack into engagement therewith, thus changing the direction of travel of the table.

The baking pans 114 is then moved sidewise upon the table 113 by the operator, and the pieces of dough are deposited thereon in a parallel row to the first row, and so on until the pan is filled.

I have also provided a flour bin 138 attached to the hopper 67, and within this flour bin 138 is mounted a shaft upon which is secured within the bin a wiper blade 142 which agitates the flour to make it pass through a perforated bottom section which is regulated by the gate 141, while upon the outer end of the shaft 139 is secured a lever 140 in contact with the toothed wheel 74 and operated thereby.

The operation of the machine is as follows—

The dough having been placed in the feed hopper, and the drum set in motion through the action of the motor, drive chains and sprockets, a pocket 34 in the drum 25 is moved into registry with the opening in the divider, the two adjacent teeth 28 in the drum side engage with and move the ratchet wheel 74 and with it the feed rollers 71, and as these rollers 71 are rotated, the presser blades will be forced out through the slots 80 and into the dough, and they then are brought together and press the dough through the opening in the divider into the pocket 34, then the drum moving severs the dough in the pocket from that in the divider, the pocket is carried forward, the pusher moves outward as actuated by the cams, the dough is ejected from the pocket and is carried between the surface of the drum and the molder band where it is molded, and ejected or dropped from the lower end of the molder band upon the endless conveyor which takes it to the baking pans.

Having thus described my invention, what I claim as new and desire to secure by Letters Patent, is—

1. In a machine for dividing and molding dough, the combination of a feed hopper for the dough, a rotating drum formed with dough conveyor pockets therein and mounted adjacent said feed hopper, means placed between said feed hopper and the drum for dividing the dough and means for drawing a portion of the dough from the hopper, pressing the same through the divider and into one of said pockets, severing said portion of dough from the main body thereof, means contained within said drum and within said pockets for varying the size of said pockets and ejecting the dough therefrom, means for adjusting the movement of said varying means, means for molding the dough after being ejected from the pockets, and while still in contact with the drum to mold the same, and means for conveying the dough from said molding means.

2. In a machine for dividing and molding dough, comprising in part of a rotating drum formed with radial pockets to receive the dough, means for adjusting the size of said pockets and means for ejecting the dough therefrom, of means for molding the ejected dough comprising a molding band mounted in spaced relation with said drum to receive the dough between said band and said drum, and means for adjusting the spaced relation between said drum and said band.

FREDERICK O. JOHNSON.